C. C. HINKLEY.
METHOD OF BALANCING CRANK SHAFTS AND APPARATUS FOR THE SAME.
APPLICATION FILED FEB. 23, 1916.
1,321,308.
Patented Nov. 11, 1919.
3 SHEETS—SHEET 1.
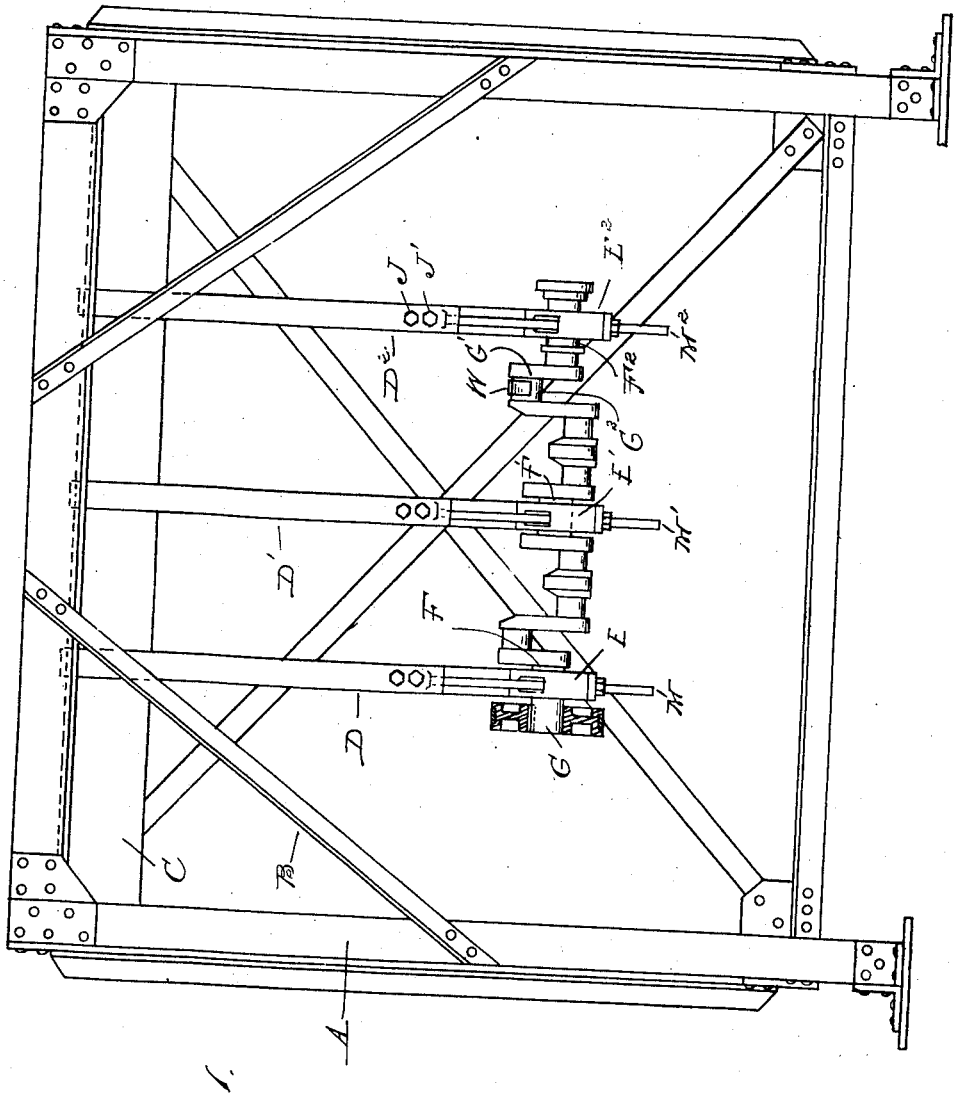
Inventor
Carl C. Hinkley
By Whittemore Hulbert & Whittemore
Attorneys

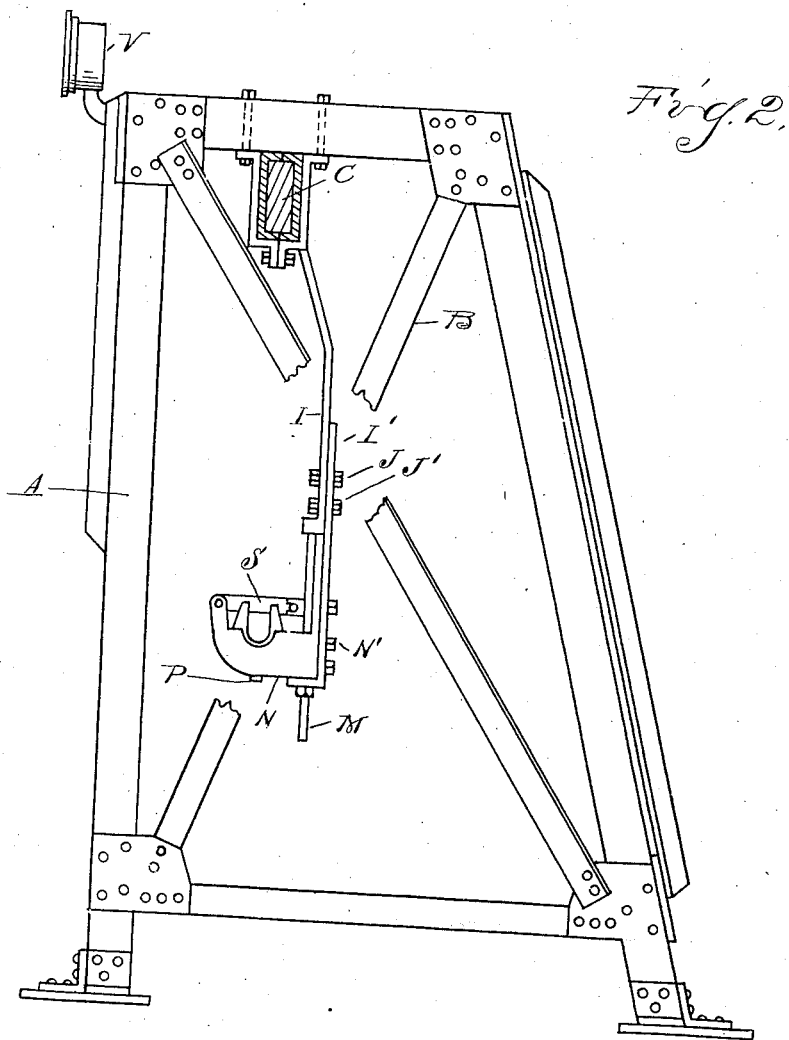

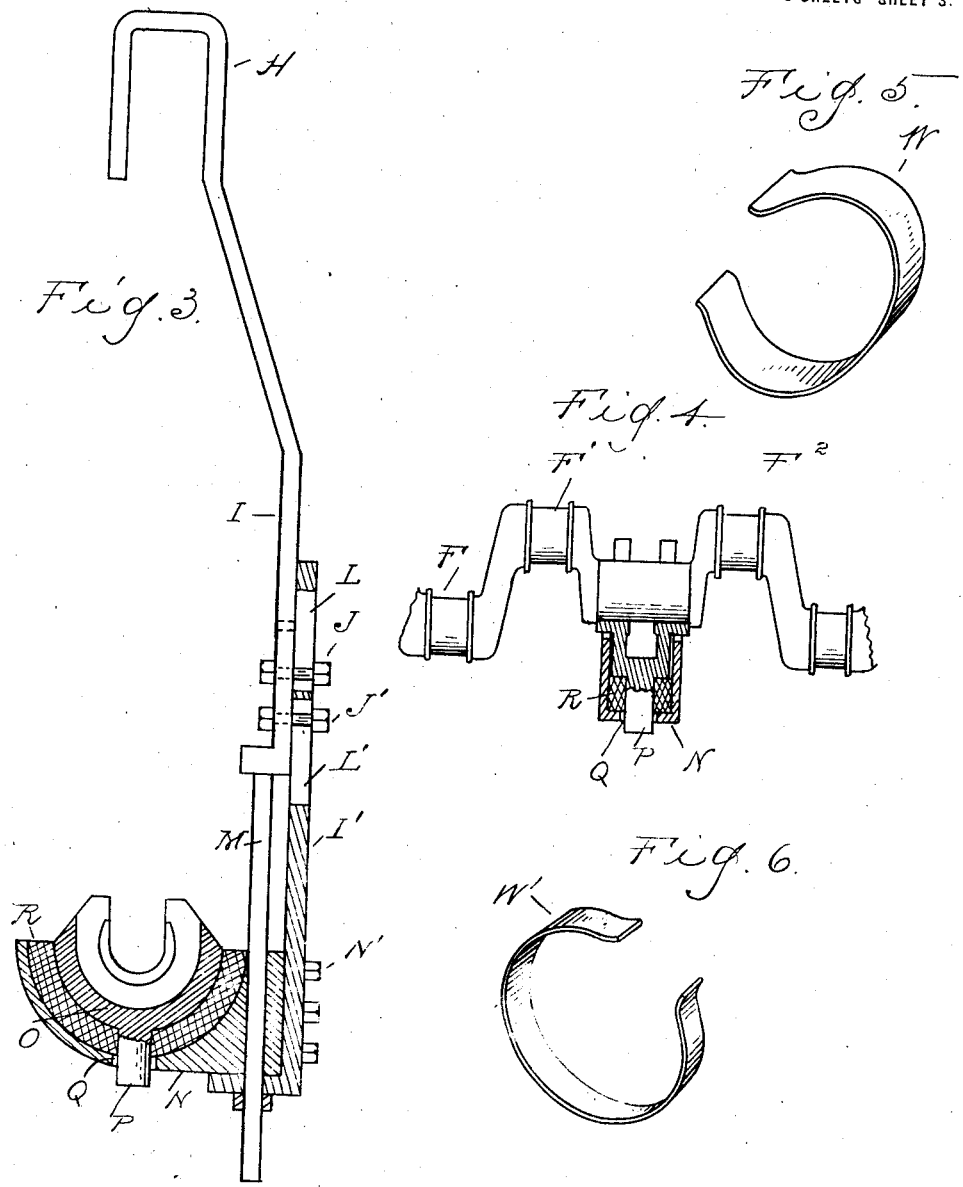

UNITED STATES PATENT OFFICE.

CARL C. HINKLEY, OF DETROIT, MICHIGAN, ASSIGNOR, BY MESNE ASSIGNMENTS, TO CHALMERS MOTOR CORPORATION, OF NEW YORK, N. Y., A CORPORATION OF NEW YORK.

METHOD OF BALANCING CRANK-SHAFTS AND APPARATUS FOR THE SAME.

1,321,308.  Specification of Letters Patent.  Patented Nov. 11, 1919.

Application filed February 23, 1916. Serial No. 79,872.

*To all whom it may concern:*

Be it known that I, CARL C. HINKLEY, a citizen of the United States of America, residing at Detroit, in the county of Wayne and State of Michigan, have invented certain new and useful Improvements in Methods of Balancing Crank-Shafts and Apparatus for the Same, of which the following is a specification, reference being had therein to the accompanying drawings.

The invention relates to the balancing of crank-shafts against centrifugal disturbance at high speed, and the invention comprises the peculiar construction of the apparatus and the method of using the same as hereinafter set forth.

In the drawings:

Figure 1 is a side elevation of the machine showing a crank-shaft to be balanced in engagement therewith;

Fig. 2 is a sectional end elevation;

Fig. 3 is a vertical sectional view through one of the bearing supports and hangers;

Fig. 4 is a vertical sectional view through one of the bearing supports at right angles to Fig. 3; and Figs. 5 and 6 are perspective views of some of the spring clips employed in measuring inaccuracies.

In the rotation of engine crank-shafts at high speeds imperceptible inaccuracies in static balance are so magnified by centrifugal action as to cause serious disturbances in the running balance. To locate and measure these inaccuracies I have provided an apparatus in which the crank-shafts or similar articles to be balanced are rotated at high speed while freely supported on bearing hangers in such a manner as to indicate the bearing affected by the inaccuracies.

The method of determining and correcting these inaccuracies will be best understood from a description of the accompanying drawings, in which I have shown one form of apparatus embodying my invention. In detail, A designates the main frame formed of steel bars, which is reinforced by cross pieces B of angle-iron or other suitable material. Supported at the upper end of the main frame is a wooden cross-bar C which is employed as a support for the floating bearings for the crank-shaft to be balanced. Depending from this cross-bar C is a plurality of bearing hangers, such as D D' and D², there being one of these hangers and a corresponding bearing support for each of the main bearings of the crank-shaft to be tested. In the particular construction shown, there are three of these bearing supports E E' and E², to receive the main bearings F F' and F² of the crank-shaft G.

At their upper ends the steel hangers D D' and D² are provided with hook-shaped ends H H' and H² respectively, which ends are loosely hinged on a wooden cross-bar C so as to permit a relatively free motion to the bearings. The steel hangers are preferably each formed by overlapping sections I and I' clamped together by bolts J and J' passing through apertures in one of the sections and elongated slots L and L' in the other section. Suitable adjusting bolts M M' and M² are employed, whereby any one of the sections I' and the corresponding bearing supports E E' and E² can be raised or lowered by turning the nut on the proper adjusting bolt. This permits the bearing supports to be accurately alined. In detail, the bearing supports E E' and E² each comprises a main body portion N supported on the section I' by bolts N'. Each floating bearing comprises a U-shaped member O having a pivotal pin P extending down through an aperture Q in the main body portion N. Between the latter and the member O there is interposed a cushion R of felt or the like, while at their upper ends the floating bearings are provided with locking members S for retaining the crank-shaft bearings in position upon the floating bearings. When the crank-shaft to be tested has been thus arranged in the floating bearings and the latter adjusted so as to be in perfect level, the crank-shaft is rotated at high speed by a removable pulley keyed to the crank-shaft and driven by an electric motor (not shown) at variable speeds under the control of the operator. A suitable tachometer V (indicated at the upper end of Fig. 2) is also employed for registering the speed at which the crank-shaft is driven.

The balancing of the crank-shaft by the employment of my improved machine is very simple and disturbances apparent at high speeds can be readily detected. The operation is as follows: The shaft G is driven by the belt-wheel at high speed and if the shaft is in perfect balance no disturbance will be noticed. However, should there be any irregularities in weight distribution a vibration will be produced, which disturbance will be more pronounced on that particular bearing in the proximity of which the disturbance originated. The operator then selects one of the spring clips W W' W², etc., and attaches it to the cheek G' or pin G² of the shaft opposite to the point at which the disturbance originated. The crank-shaft G is again rotated at high speed and clips of varying weight applied to the opposite cheek or pin until a perfect running balance is obtained. The weight of the clips applied, which weight is carefully established, will then indicate the amount of metal to be removed from the cheek or pin opposite to that upon which the spring clip was fastened. In this way disturbances which are imperceptible in static balance can be readily detected, and with this apparatus a perfect running balance at a speed of twenty-four hundred R. P. M. or higher can be easily obtained. The construction of the apparatus and the method of determining and correcting the disturbances are not, however, limited to the details of construction shown and described except as they are specified in the appended claims.

What I claim as my invention is:—

1. In a balancing machine for crank-shafts and the like, the combination with means by which a crank shaft may be driven at high speed, of means for supporting the crank shaft so as to indicate the portion of the crank shaft in which there is any irregularity in weight distribution, and means for temporarily increasing by a definite amount the weight at the opposite side of the crank shaft from that of the disturbing portion to indicate the unbalancing moment wherefrom may be determined the location and quantity of material to be removed from the latter side to obtain a balanced rotation of the shaft.

2. The method of balancing a crank-shaft, which comprises rotating the shaft at high speed, so supporting the shaft as to indicate any irregularities in weight distribution, applying temporary weights to the side opposite from that on which the weight disturbance arises to indicate the degree of unbalancing and removing from the latter side a corresponding amount of metal properly located to produce equilibrium in the rotating shaft.

3. The method of balancing crank-shafts, which comprises rotating the shaft at high speed, while supported, so as to indicate by vibration the bearing in the proximity of which the weight disturbance arises, applying temporary weights to the cheek or pin of the shaft opposite to the point at which the disturbance originated until equilibrium is restored, then removing a corresponding amount of metal from the cheek or pin opposite that to which the temporary weight was applied.

In testimony whereof I affix my signature in presence of two witnesses.

CARL C. HINKLEY.

Witnesses:
W. H. RADFORD,
CHAS. L. NEDOMA.